United States Patent
Schindel

[15] 3,659,689
[45] May 2, 1972

[54] SEAL DEVICE

[72] Inventor: Arnold Schindel, Fairlawn, N.J.
[73] Assignee: The Singer Company, New York, N.Y.
[22] Filed: Oct. 8, 1970
[21] Appl. No.: 79,025

[52] U.S. Cl..............................192/112, 192/113 B, 64/32, 277/135
[51] Int. Cl.......................................................F16d 13/74
[58] Field of Search..........................192/112, 113 B; 64/32; 277/135; 251/355

[56] References Cited

UNITED STATES PATENTS

| | | | |
|---|---|---|---|
| 2,842,336 | 7/1958 | Johnson | 277/135 |
| 2,927,829 | 3/1960 | Porter | 277/135 |
| 3,170,482 | 2/1965 | Wicoff | 277/135 |

Primary Examiner—William F. O'Dea
Assistant Examiner—Randall Heald
Attorney—S. A. Giarratana and Thomas W. Kennedy

[57] ABSTRACT

A seal device for restricting flow of a fluid, such as a mixture of air and vapor, between two pressure areas established with respect to a rotary member, wherein the rotary member and its drive member form a channel therebetween and each has a plurality of spaced annular grooves formed on a surface thereof, with the grooves on the rotary member adapted to register with the grooves on the drive member to form axially spaced annular chambers extending between the pressure areas. A sealing fluid is disposed in the grooves and in the channel to provide the seal. The device may be incorporated in a clutch assembly whereby actuation of the clutch pressurizes the sealing fluid.

9 Claims, 3 Drawing Figures

PATENTED MAY 2 1972 3,659,689

INVENTOR
ARNOLD SCHINDEL

BY
ATTORNEY

SEAL DEVICE

BACKGROUND OF THE INVENTION

This invention relates to a sealing device and more particularly to such a device for sealing between two pressure areas established with respect to a rotary member.

In conventional types of rotary seals, carbon ring face seals, elastomer O-rings, or the like, are normally utilized. However, these seals do not guarantee an absolute hermetic quality for several reasons. For example, in the case of the O-ring, very slight surface imperfections, fissures, or permeability of the ring itself, along with the lack of sufficient energization to provide a seal, detract from the effectiveness of the seal. Therefore, the absolute hermetic sealing of a rotating device with an air and/or vapor medium in a bidirectional mode is very difficult, if not impossible, to achieve.

SUMMARY OF THE INVENTION

It is therefore an object of the present invention to provide a seal of the above type which substantially eliminates all leakage between two pressure areas established with respect to a rotary device.

Toward the fulfillment of this object, the seal of the present invention comprises a rotary member having a plurality of axially spaced grooves on a surface thereof, a drive member in proximity to said rotary member and having corresponding annular grooves formed on a surface thereof, said surface of said rotary member and said surface of said drive member defining a channel therebetween, the grooves on said rotary member adapted to register with the grooves on said drive member to form axially spaced annular chambers in flow communication with said channel and extending between said pressure areas, a sealing fluid disposed in said grooves and said channel, and means for pressurizing said sealing fluid.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

The seal device of the present invention is shown by means of example in conjunction with a dry disc clutch which is adapted to connect a drive gear to a rotating output shaft, it being understood that the seal device of the present invention is not limited to this application, but can be utilized in almost innumerable environments.

Figure 1:
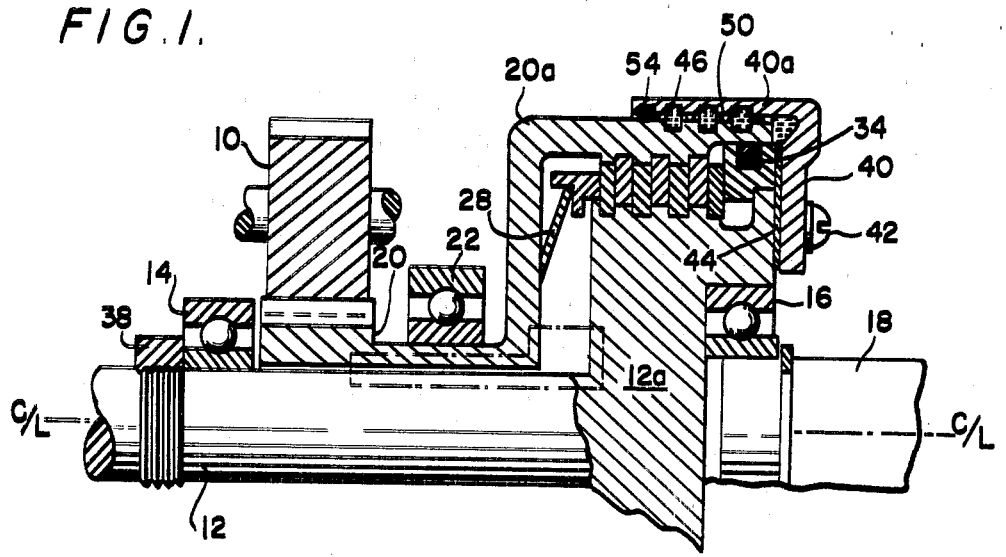
FIG. 1 is a partial cross-sectional view of a rotating shaft and a dry disc clutch connecting same to an input gearing utilizing the seal of the present invention, with the shaft being shown in elevation.

For the convenience of presentation, FIG. 1 is a partial view depicting the upper portion of the above structure above the center line C/L, it being understood that the structure is identical below this center line.

In general, an input gear 10 is provided which is driven by a motor, or the like (not shown), and is adapted to drive an output shaft 12 which, for the purposes of example, may be utilized in an automatic pilot actuator, with the shaft leading to a linkage system of pulleys and cables which, in turn, connect to a primary flight control system. The shaft 12 has a portion 12a of an enlarged diameter, and is supported for rotation by means of a bearing 14 interfaced to ground, and a bearing 16 connected to a fixed support member 18.

A drive member 20 is interposed between the input gear 10 and the shaft 12 and is rotatably supported by means of a bearing 22 interfaced to ground. An end portion of the drive member 20 is formed with teeth in meshing arrangement with the gear 10, and an enlarged portion 20a of the drive member extends around the enlarged shaft portion 12a.

Figure 2:
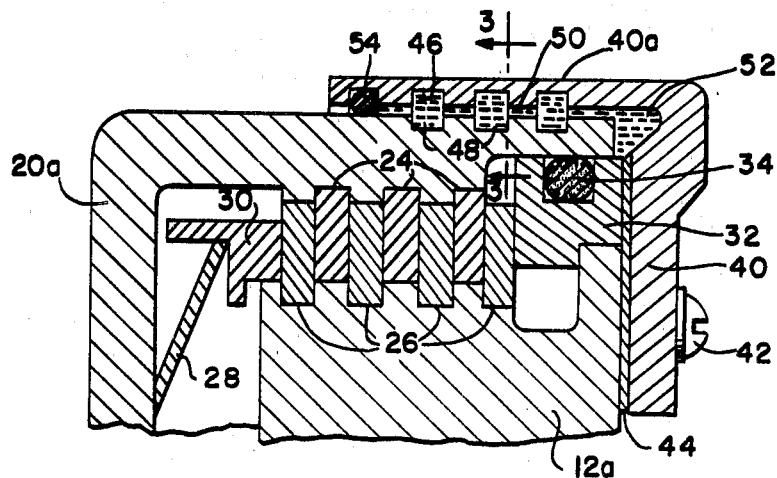
FIG. 2 is an enlarged partial view of the structure of FIG. 1.
Figure 3:
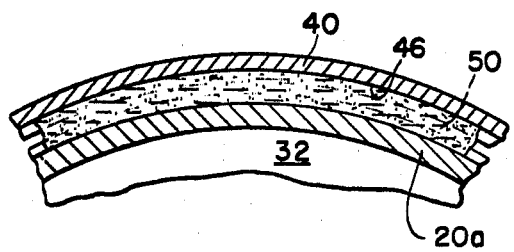
FIG. 3 is a cross-sectional view taken along the line 3—3 of FIG. 2.

As better seen in FIG. 2, the inner surface of the enlarged drive member portion 20a and the outer periphery of the enlarged shaft portion 12a are each provided with a plurality of annular clutch discs 24 and 26, respectively, the corresponding teeth of which are disposed in axial grooves formed in the portions 12a and 20a. The discs 26 are adapted to frictionally engage the discs 24 to operatively connect the drive member 20 to the shaft 12. A belleville spring 28 bears against the inner wall of the enlarged drive member portion 20a, and engages an adaptor ring 30 which in turn applies the actuating force to the discs 24 and 26 to provide for a controlled frictional slippage.

An additional adaptor ring 32 is provided at the other end of the discs in abuttment with the end disc 26, and may be either shrunk-fit or cemented onto the enlarged shaft portion 12a. An O-ring 34 provides a seal between the adaptor ring 32 and the inner surface of the enlarged drive member portion 20a.

The clutch thus described is set for actuation level by means of a nut 38 which butts against an end of the inner race of the bearing 14 and threadedly engages the shaft 12, so that rotation of the nut causes relative axial movement between the shaft 12 and the drive member 20 to regulate the degree of friction between the cooperating discs 24 and 26, and therefore the operative connection between the drive member 20 and the shaft 12. It is understood that the bearings 14 and 16 are adapted for a corresponding amount of axial float to accomodate the above movement.

A plate 40 is assembled to the right-hand portion of the enlarged shaft portion 12a, and is fastened thereto by means of a plurality of screws, one of which is shown by the reference numeral 42. A gasket 44 provides a seal between the shaft portion 12a and the plate 40. An annular flange 40a is integral with the plate 40 and extends around the outer periphery of a portion of the enlarged drive member portion 20a. A plurality of axially spaced, annular grooves 46 are formed on the inner periphery of the flange 40a, and a corresponding number of annular grooves 48 are formed on the outer periphery of the enlarged drive member portion 20a in register with the grooves 46 to define a plurality of annular chambers. The inner periphery of the flange 40a is slightly spaced from the outer periphery of the enlarged drive member portion 20b to define a flow channel 50 therebetween which connects the chambers formed by the grooves 46 and 48. This spacing is exaggerated in FIGS. 1 and 2 to better depict the flow channel.

The end of the enlarged drive member portion 20a is slightly spaced from the corresponding inner surface of the plate 40 to provide a fluid cavity 52 registering with the channel 50, and an O-ring 54 is disposed in a groove formed in the inner surface of the flange 40a near the end thereof. A sealing fluid, such as grease, is disposed in the cavity 52, in the channel 50 and, of course, in the annular chambers defined by the grooves 46 and 48. This grease may be of any conventional type, the only requirement being that it have a higher viscosity than that of the medium being sealed, which in most circumstances would be atmosphere.

When the shaft member 12 is moved axially inwardly, or in a direction from right to left as viewed in FIG. 1, by rotation of the nut 38 in order to energize the clutch, a pressure is also applied to the sealing fluid in the above areas, so that the fluid will be highly pressurized to form a wedge in the annular chambers which must be sheared before any leakage will occur. Also, the fluid will fill all voids and surface irregularities in the corresponding structure which contribute to the integrity of the seal.

It is noted that the seal just described is bidirectional in operation, i.e., it will not only prevent an external media such as atmosphere from entering the various cavities formed by the structure, but will also prevent the mixture of air which has been trapped within the clutch from bleeding out into the atmosphere and thereby damaging the integrity of the seal.

Of course, several variations of the above can be made without departing from the scope of the invention. As emphasized above, the seal device of the present invention is not limited to the specific environment shown, but may be applied to any environment, according to applications of one skilled in the art. Also, an additional sealing device similar to that provided between the flange 40a and the enlarged drive member portion 20a may be provided between the shaft 12 and the drive member 20 in the general area shown by the dash lines in FIG. 1. Further, the plate 40 and flange 40a may be constructed of a flexible material to allow for expansion of the sealing fluid and to compensate for any irregularities in the remaining structure. Still further, the grooves 46 and 48 do not necessarily have to be of the same width since, due to the axial displacement pursuant to energization of the clutch, overlapping of the grooves may be necessary for contiguity of the grease seal. Also, the utilization of the O-ring 54 is not absolutely necessary, but can be added as an additional shelter barrier if the axial length of the device allows it.

Of course, other variations of the specific construction and arrangement of the seal device disclosed above can be made by those skilled in the art without departing from the invention as defined in the appended claims.

I claim:

1. A rotary shaft seal for restricting fluid flow between two pressure areas of a shaft and clutch assembly having a longitudinal axis, said seal comprising a rotary member having a plurality of spaced annular grooves formed on a surface thereof, a drive member in proximity to said rotary member, and a hollow clutch member connected to said drive member and encircling said rotary member, said clutch member being axially displaceable relative to said rotary member for selectively engaging said rotary member, said clutch member having corresponding annular grooves formed on a surface thereof and adapted to register with the grooves on said rotary member to form spaced annular chambers extending between said pressure areas, and a sealing fluid disposed in said grooves.

2. The seal of claim 1 wherein said surface of said rotary member and said surface of said clutch member define a channel therebetween connecting said chambers, said fluid being disposed in said channel.

3. The seal of claim 2 wherein said rotary member comprises a shaft portion and a seal portion affixed to said shaft portion, a portion of said seal portion being radially spaced from said shaft portion with a portion of said clutch member extending therebetween.

4. A rotary shaft seal for restricting fluid flow between two pressure areas comprising a rotary member having a plurality of spaced annular grooves formed on a surface thereof, a drive member in proximity to said rotary member and having corresponding annular grooves formed on a surface thereof and adapted to register with the grooves on said rotary member to form spaced annular chambers extending between said pressure areas, and a sealing fluid disposed in said grooves, wherein said surface of said rotary member and said surface of said drive member define a channel therebetween connecting said chambers, said fluid being disposed in said channel, wherein said rotary member comprises a shaft portion and a seal portion affixed to said shaft portion, a portion of said seal portion being radially spaced from said shaft portion with a portion of said drive member extending therebetween, and wherein a cavity for said sealing fluid is defined by said seal portion and said drive member and registers with said channel, said relative axial movement decreasing the volume of said cavity and pressurizing said fluid in said cavity and said chambers.

5. A rotary shaft seal for restricting fluid flow between two pressure areas comprising a rotary member having a plurality of spaced annular grooves formed on a surface thereof, a drive member in proximity to said rotary member and having corresponding annular grooves formed on a surface thereof and adapted to register with the grooves on said rotary member to form spaced annular chambers extending between said pressure areas, and a sealing fluid disposed in said grooves, wherein said surface of said rotary member and said surface of said drive member define a channel therebetween connecting said chambers, said fluid being disposed in said channel, and wherein said drive member forms part of a clutch with a portion of said rotary member, the clutch being actuated in response to relative axial movement between said members, and further comprising means to pressurize said sealing fluid in response to said relative axial movement.

6. The seal of claim 7 wherein said sealing fluid is of a higher viscosity than the medium to be sealed.

7. A rotary device comprising a drive member, a rotary output shaft, clutch means adapted to operatively connect said drive member and said output shaft, and means to actuate said clutch means; wherein the improvement comprises a first seal member carried by said shaft and having a plurality of spaced annular grooves formed on a surface thereof, a second seal member carried by said clutch means and disposed in proximity to said first seal member, said second seal member having a plurality of spaced annular grooves in register with the grooves on said first seal member to form a plurality of spaced annular chambers, and a sealing fluid disposed in said grooves.

8. The improvement of claim 6 wherein said surface of said shaft and said surface of said drive member define a channel therebetween connecting said chambers, said fluid being disposed in said channel.

9. The improvement of claim 6 wherein said means to actuate said clutch means comprises means to effect relative axial movement between said drive members and said shaft, and further comprising means responsive to said axial movement for pressurizing said sealing fluid.

* * * * *